(12) United States Patent  (10) Patent No.: US 8,867,851 B2
Wang et al.  (45) Date of Patent: Oct. 21, 2014

(54) SPARSE CODING BASED SUPERPIXEL REPRESENTATION USING HIERARCHICAL CODEBOOK CONSTRUCTING AND INDEXING

(71) Applicant: Seiko Epson Corporation, Tokyo (JP)

(72) Inventors: Jinjun Wang, San Jose, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 146 days.

(21) Appl. No.: 13/712,246

(22) Filed: Dec. 12, 2012

(65) Prior Publication Data

US 2014/0161355 A1  Jun. 12, 2014

(51) Int. Cl.
G06K 9/62  (2006.01)

(52) U.S. Cl.
CPC ........................................ G06K 9/62 (2013.01)
USPC ............................................. 382/228; 382/173

(58) Field of Classification Search
CPC ................. G06T 7/0093; G06T 2207/20076; G06T 2207/20144; G06T 7/401; G06T 2207/20016; G06T 2207/20141; G06T 7/0087; G06K 9/34; G06K 9/342; G06K 9/00228; G06K 9/6224; G06K 9/6267
See application file for complete search history.

(56) References Cited

U.S. PATENT DOCUMENTS

| 6,041,133 | A | 3/2000 | Califano et al. | |
| 6,556,705 | B1* | 4/2003 | Shalom | 382/154 |
| 6,691,126 | B1 | 2/2004 | Syeda-Mahmood | |
| 7,343,032 | B2 | 3/2008 | Oakley et al. | |
| 7,680,748 | B2 | 3/2010 | Heisele et al. | |
| 8,229,178 | B2 | 7/2012 | Zhang et al. | |
| 8,538,138 | B2* | 9/2013 | Krishnan et al. | 382/154 |
| 2006/0008124 | A1 | 1/2006 | Ewe et al. | |
| 2007/0217665 | A1 | 9/2007 | Kiraly et al. | |
| 2008/0298646 | A1* | 12/2008 | Wennergren | 382/124 |
| 2009/0080774 | A1* | 3/2009 | Lin et al. | 382/176 |
| 2009/0175505 | A1 | 7/2009 | Muquit et al. | |
| 2010/0157322 | A1* | 6/2010 | Conlon | 358/1.2 |
| 2010/0198078 | A1 | 8/2010 | Abe | |
| 2011/0012898 | A1* | 1/2011 | Krishnan et al. | 345/419 |
| 2012/0148162 | A1* | 6/2012 | Zhang et al. | 382/195 |
| 2012/0251003 | A1* | 10/2012 | Perbet et al. | 382/173 |
| 2012/0327172 | A1* | 12/2012 | El-Saban et al. | 348/14.02 |
| 2013/0071016 | A1* | 3/2013 | Omer et al. | 382/164 |
| 2013/0226548 | A1* | 8/2013 | Beck et al. | 703/11 |

OTHER PUBLICATIONS

Thompson, D. R., et al., "Sparse superpixel unmixing for exploratory analysis of CRISM hyperspectral images", IEEE, Workshop on Hyperspectral Image and Signal Processing: Evolution in Remote Sensing, 2009.

(Continued)

Primary Examiner — Jingge Wu

(57) ABSTRACT

Embodiments of the present invention include systems and methods for identifying an object in an image. In embodiments, object identification includes using smooth encoding from a tree structure to generate a feature from a descriptor. In embodiments, the smooth encoding may be performed by, having identifying a leaf node for a descriptor, moving up the tree voting structure a number of levels from the identified leaf node to a branch node to identify leaf nodes dependent from the branch node; and then, by determining a sparse code under a condition that a distance between the descriptor and centroids of the leaf nodes dependent from the branch node weighted by the sparse code is minimized, wherein each element of the sparse code representing a weight corresponding to leaf nodes.

20 Claims, 11 Drawing Sheets

(56) References Cited

OTHER PUBLICATIONS

Fulkerson, B., et al., Class Segmentation and Object Localization with Superpixel Neighborhoods, Computer Vision, IEEE 2009.

Tang, C., et al., "Uncovering Vein Patterns From Color Skin Images for Forensic Analysis", IEEE Conference on Computer Vision and Pattern Recognition (CVPR), Jun. 20-25, 2011, pp. 665-672.

* cited by examiner

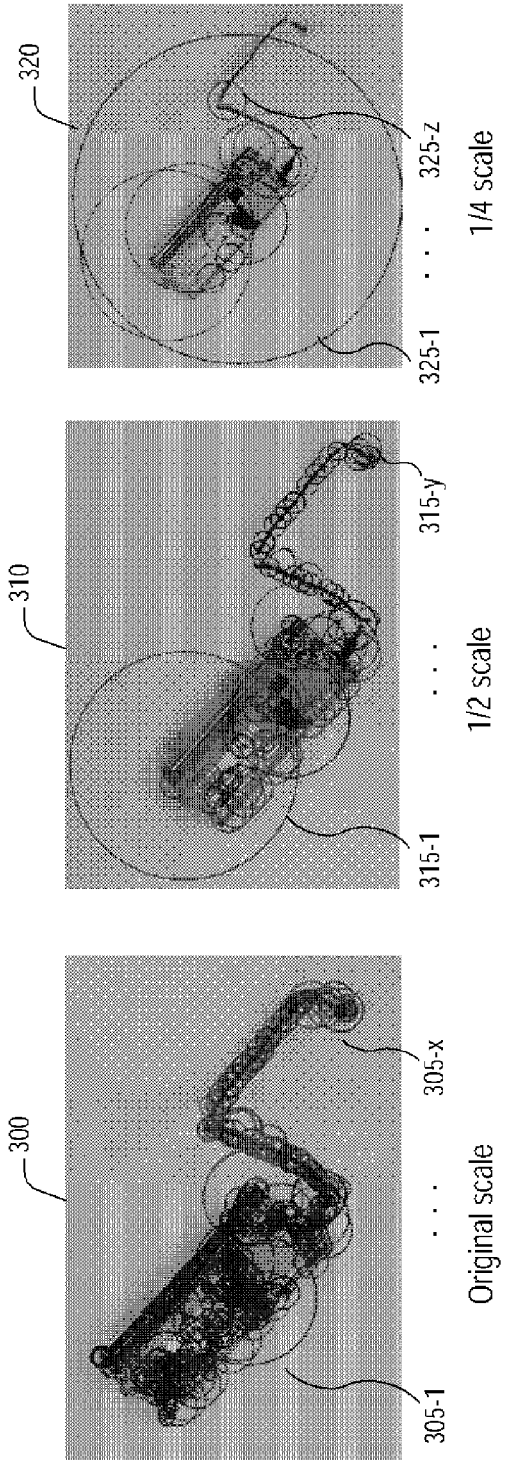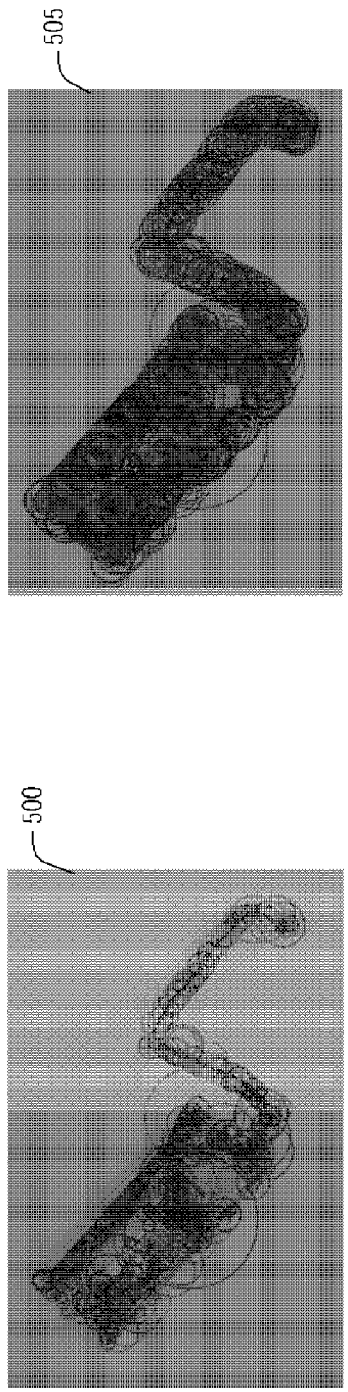

SPARSE CODING BASED SUPERPIXEL REPRESENTATION USING HIERARCHICAL CODEBOOK CONSTRUCTING AND INDEXING

A. TECHNICAL FIELD

The present invention relates to digital image processing, more particularly, to systems and methods for recognizing and locating objects in an image.

B. DESCRIPTION OF THE RELATED ART

Searching for an object in an image is a well-known problem in the art of machine vision, with many known solutions. In general, there are two types of methods for searching and recognizing an object in an image: the classification-based method, and the detection based method. The classification-based method includes the holistic feature extraction method and the local feature extraction method, for instance. In general, the holistic feature extraction method takes a whole image of an object and recognizes the object. However, this method has a disadvantage, in that it fails to locate the object. In cases where the location information of the object in the image is needed, the holistic feature extraction method may not be a suitable approach. The local feature extraction method characterizes important local features, such as edges, spikes, or transient, to recognize an object. However, like the holistic extraction method, the local feature extraction method does not provide the location information of the recognized object.

The detection-based method can provide the location information as well as the identification of an object. For instance, a scanning window method may be applied to recognize a rigid object and to determine the location of the object. However, this method cannot reliably recognize a non-rigid object, such as flexible/deformable body. Deformation model, which is another detection-based method, is suited for recognition of a non-rigid object. The deformation model segments an image of an object into smaller sized objects and the spatial relationship between the smaller sized objects are analyzed to recognize the object. However, this approach is limited to non-rigid objects that are moderately deformable objects but not highly deformable objects, such as flexible cables. Also, the segmentation of the image into smaller objects is usually heuristic, and scanning both the image and each individual segment dramatically increases computation time.

Accordingly, there is a need for improved systems and methods for recognizing objects, particularly flexible objects, in an image and locating the recognized objects.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIGS. 3a-3c show patches applied to multiple scale images of an object for detecting feature points according to embodiments of the present invention.

FIG. 5a shows patches applied to an image of an object for extracting local descriptors, where the patch sizes are automatically determined according to embodiments of the present invention.

FIG. 5b shows patches applied to an image of an object for extracting local descriptors, where some of the patches have a fixed size according to embodiments of the present invention.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Also, it shall be noted that steps or operations may be performed in different orders or concurrently, as will be apparent to one of skill in the art. And, in instances, well known process operations have not been described in detail to avoid unnecessarily obscuring the present invention.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules. Components or modules may be implemented in software, hardware, or a combination thereof.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Figure 1:
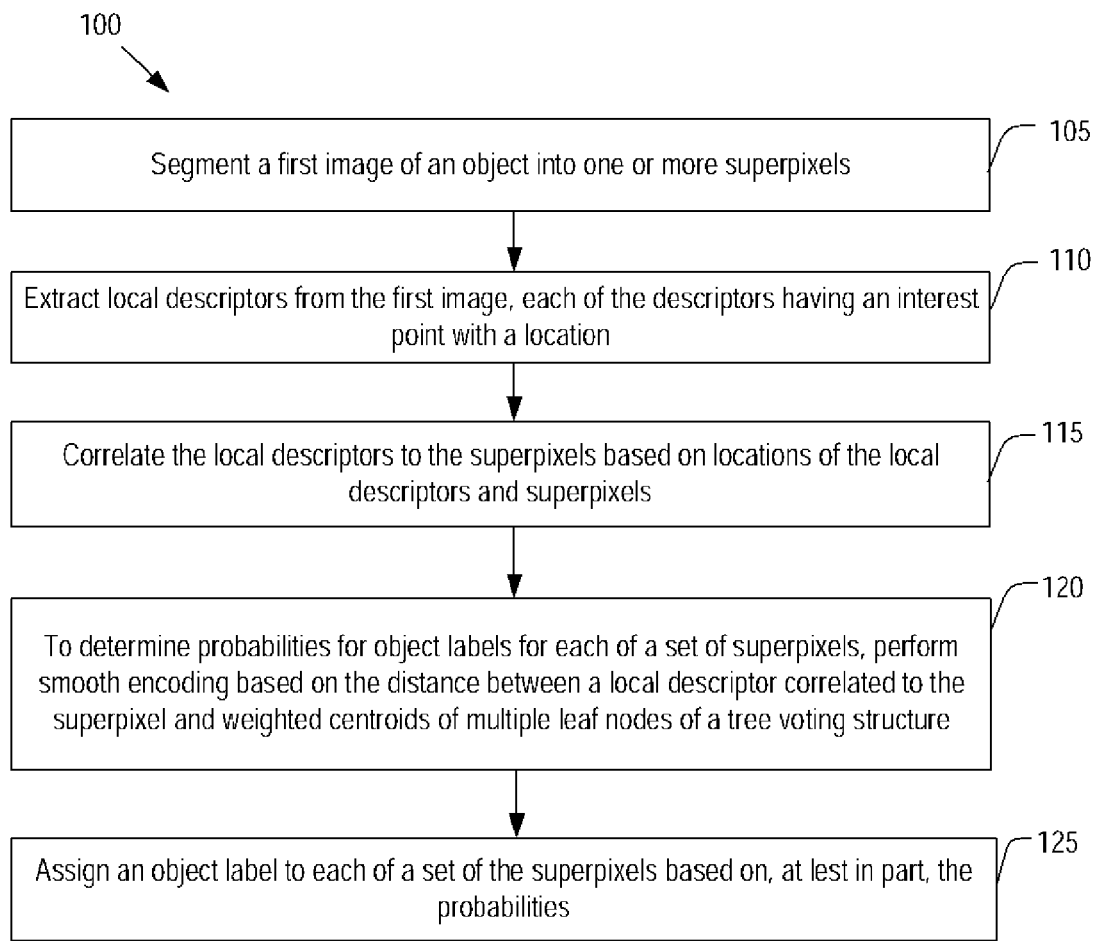
FIG. 1 shows a flowchart of an illustrative process for recognizing an object in an image according to embodiments of the present invention.
Figure 2:
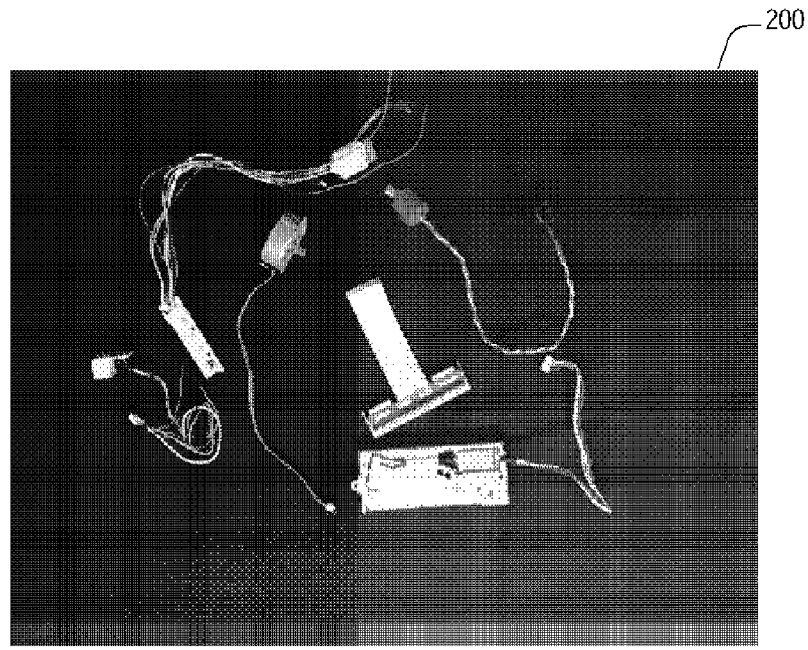
FIG. 2 shows an exemplary image of electrical components to be recognized.

FIG. 1 shows a flowchart 100 of an illustrative process for recognizing an object in an image according to embodiments of the present invention. FIG. 2 shows an exemplary image 200 of electrical components to be recognized. As depicted in FIG. 2, the image includes rigid and non-rigid electrical components. It should be apparent to those of ordinary skill in the art that the present invention may be applied to recognize rigid and non-rigid bodies.

Referring back to FIG. 1, in embodiments, the process starts at step 105. At step 105, an image is segmented into one or more superpixels, where each superpixel may contain a portion of an object in the image and/or background. Hereinafter, the terms superpixel and segment may be used interchangeably. One skilled in the art shall recognize that there are a number of methods that may be employed to segment the image, including without limitation the method of segmenting the image based on the color of each pixel of the image. No particular segmentation method is critical. It should be apparent to those of ordinary skill that other characteristic or features may be used to segment the image.

At step 110, the local descriptors are extracted from the image. Each local descriptor is associated with an image patch and is a description of the contents contained in the associated patch. FIG. 3a shows an image 300 having patches 305-1-305-x applied to extract local descriptors from the image. In embodiments, each patch corresponds to a local descriptor and includes a feature point within the patch, which may be a pixel at the center of the patch although other positions may be selected. In embodiments, the total number patches 305-1-305-x may be automatically determined by conventional methods known to those of ordinary skill in the art. Examples include scale-invariant feature transform (SIFT), although other methods, such as Histogram of Oriented Gradient (HOD), Gradient Location and Orientation Histogram (GLOH), and Local Binary Pattern (LBP) may be used. It is noted that steps 105 and 110 may be done simultaneously or in different order.

Figure 4:
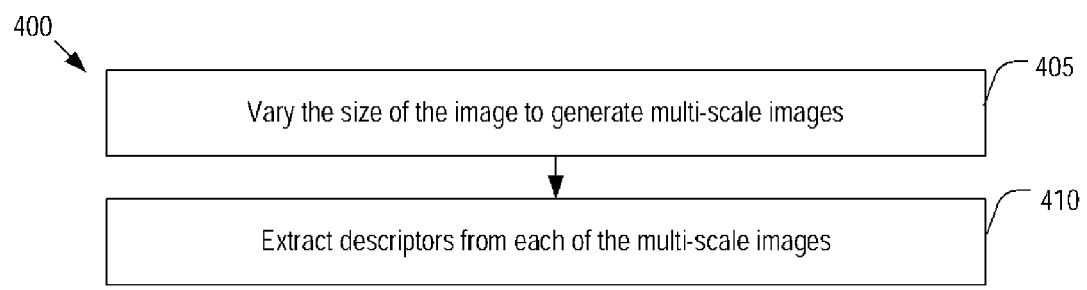
FIG. 4 shows a flowchart of an illustrative process for extracting local descriptors according to embodiments of the present invention.

FIG. 4 shows a flowchart 400 of an illustrative process for extracting local descriptors according to embodiments of the present invention. Flowchart 400 shows exemplary steps that might be taken to carry out step 110. In embodiments, multi-scale images are generated by varying the size of the image at step 405. Then, at step 410, in embodiments, local descriptors are extracted by the same manner as described in conjunction with FIG. 3a.

FIGS. 3b and 3c show two images 310 and 320 that are generated by scaling down the original image 300 by factors of 2 and 4, respectively, and local descriptors are extracted from these images. As depicted, the number of patches in images 310 and 320 may be the same or different from that in image 300. A main reason to extract local descriptors from multi-scale images is that different features may be extracted from different scale images, i.e., some of patches 315-1-315-y may not be detected in the other images 300 and 320, and some of patches 325-1-325-z may not be detected in the other images 300 and 310. In embodiments, all of the local descriptors extracted from the multi-scale images 300, 310, and 320 may be used in carrying out steps 115-125 in flowchart 100.

In embodiments, the size of the patches for extracting features may be fixed, variable, or a combination thereof. FIG. 5a shows patches applied to an image 500 of an object for extracting local descriptors, wherein the patch sizes are automatically determined according to embodiments of the present invention. In embodiments, the local descriptor methods may automatically determine the patch size. Such methods include but are not limited to Difference of Gaussians (DOG), or Harris-Laplacian interest point detector. Other such methods are known to those skilled in the art.

In embodiments, patches of fixed size may be used, which size may be selected, based upon application, for other reasons. FIG. 5b shows patches applied to an image 505 of an object for extracting local descriptors, wherein at least some of the patches have a fixed size according to embodiments of the present invention. It is apparent to those of ordinary skill that patches of different fixed sizes may be added without deviating from the scope of the present invention.

Figures 6, 7:
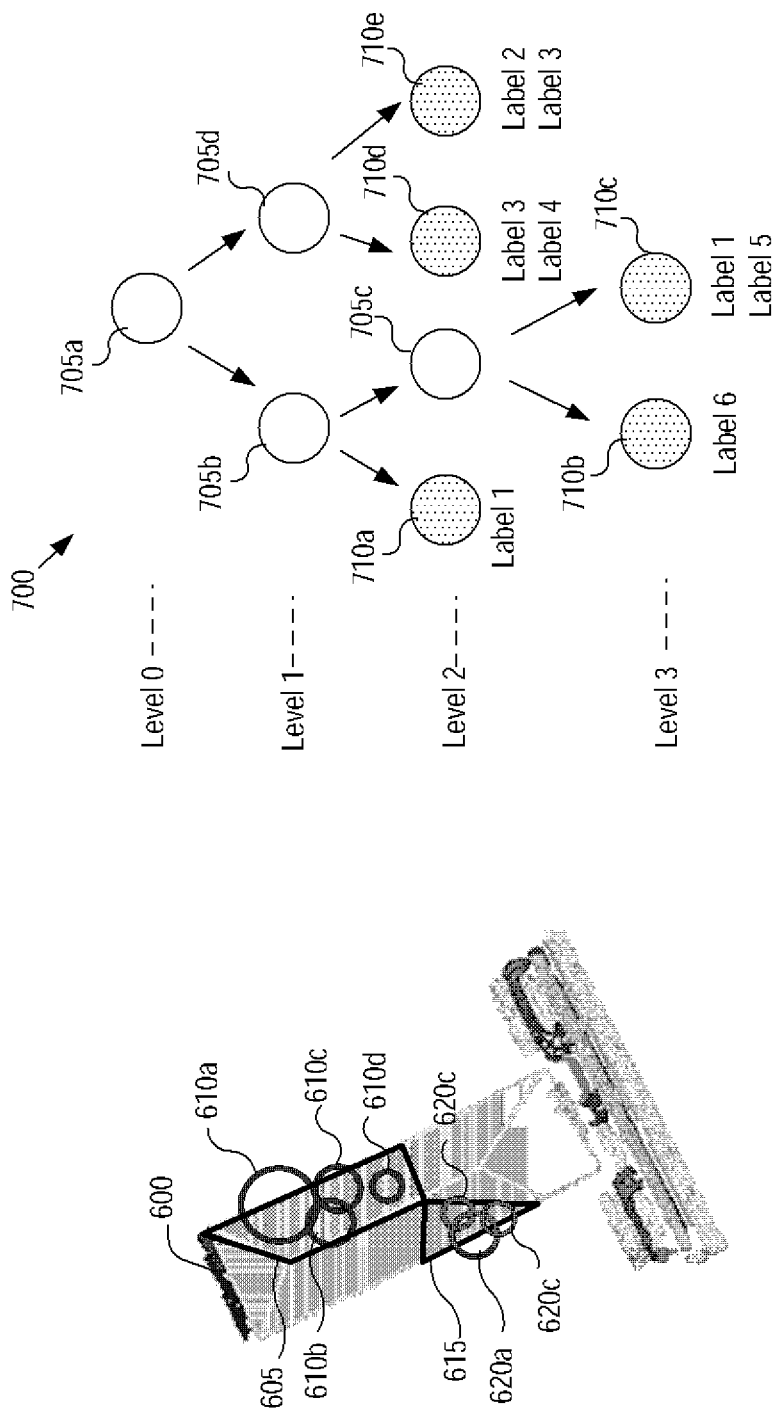
FIG. 6 shows an image of one of the electrical components in FIG. 2, where the image includes superpixels associated with multiple patches, according to embodiments of the present invention.
FIG. 7 shows an exemplary tree voting structure that might be applied to patches for a tree-plus-regression vote according to embodiments of the present invention.

Referring back to FIG. 1, in embodiments, extracted local descriptors are correlated to a superpixel based on the locations of the local descriptors and superpixel at step 115. As discussed above, in embodiments, each patch has a feature point, wherein the feature point is one or more of the image pixels within each patch. For instance, in embodiments, the patch may have a circular shape and the feature point may be the center of the circle. In embodiments, if the feature point of a patch is located within a superpixel, the patch is associated with that superpixel. FIG. 6 shows an image 600 of one of the electrical cables in FIG. 2, where image 600 includes superpixels 605 and 615 having patches 610a-610d and 620a-620c, respectively. As depicted, the centers of patches 610a-610d are located within superpixel 605, causing the patches to be correlated to superpixel 605. Likewise, the centers of patches 620a-620c are located within superpixel 615, causing the patches to be correlated to superpixel 615. It is noted that image 600 has several superpixels, but for brevity, the other superpixels are not indicated in FIG. 6.

In embodiments, an approach for determining the probabilities for object labels for each superpixel, which is referred to as tree-plus-regression method (or, tree-based regression vote), uses a tree voting structure based on a set of parameters. In FIG. 7, there is shown an exemplary tree voting structure 700 that might be applied to local descriptors for performing the tree-plus-regression vote according to embodiments of the present invention. As depicted, the tree voting structure 700 includes branch nodes 705a-705d and leaf nodes 710a-710e distributed along the four levels Level 0-Level 3, where branch node 705a is the root node. It is noted that the numbers of levels, branch nodes, and leaf nodes in tree voting structure 700 are selected for the purposes of illustration. Also, it is assumed that there are only 6 object labels (or, equivalently, object types), wherein each of leaf nodes 710a-710e may include one or more object labels. For instance, the leaf node 710c includes object labels 1 and 5. Thus, when either a local descriptor of object type 1 or object type 5 is input to tree voting structure 700, the tree voting structure may predict leaf node 710c.

It is noted that one skilled in the art shall recognize that the tree voting structure 700 is trained before a query local descriptor is input thereto. For example, in embodiments, steps 105-115 are taken to generate superpixels of an image of a known cable type (or, known object label type) and to extract local descriptors from the image. Then, the tree voting structure 700 is generated and trained so that the tree voting structure predicts the known object label for each of the superpixels in the image. Upon completion of training tree voting structure 700, it may be used to determine the probabilities for object labels for each local descriptor of an image.

Figure 8:
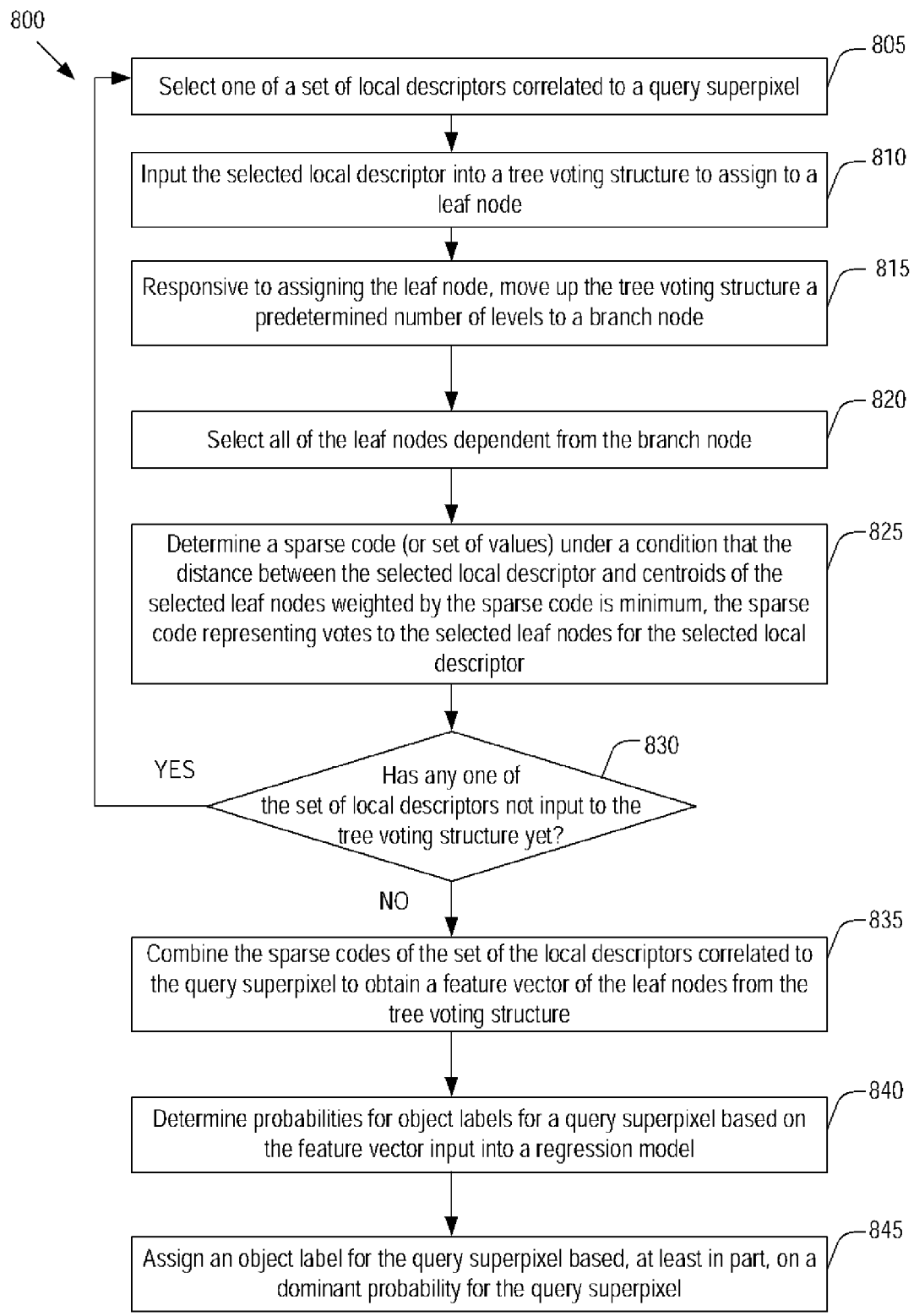
FIG. 8 shows a flowchart of an illustrative process for performing sparse encoding according to embodiments of the present invention.
Figure 9:
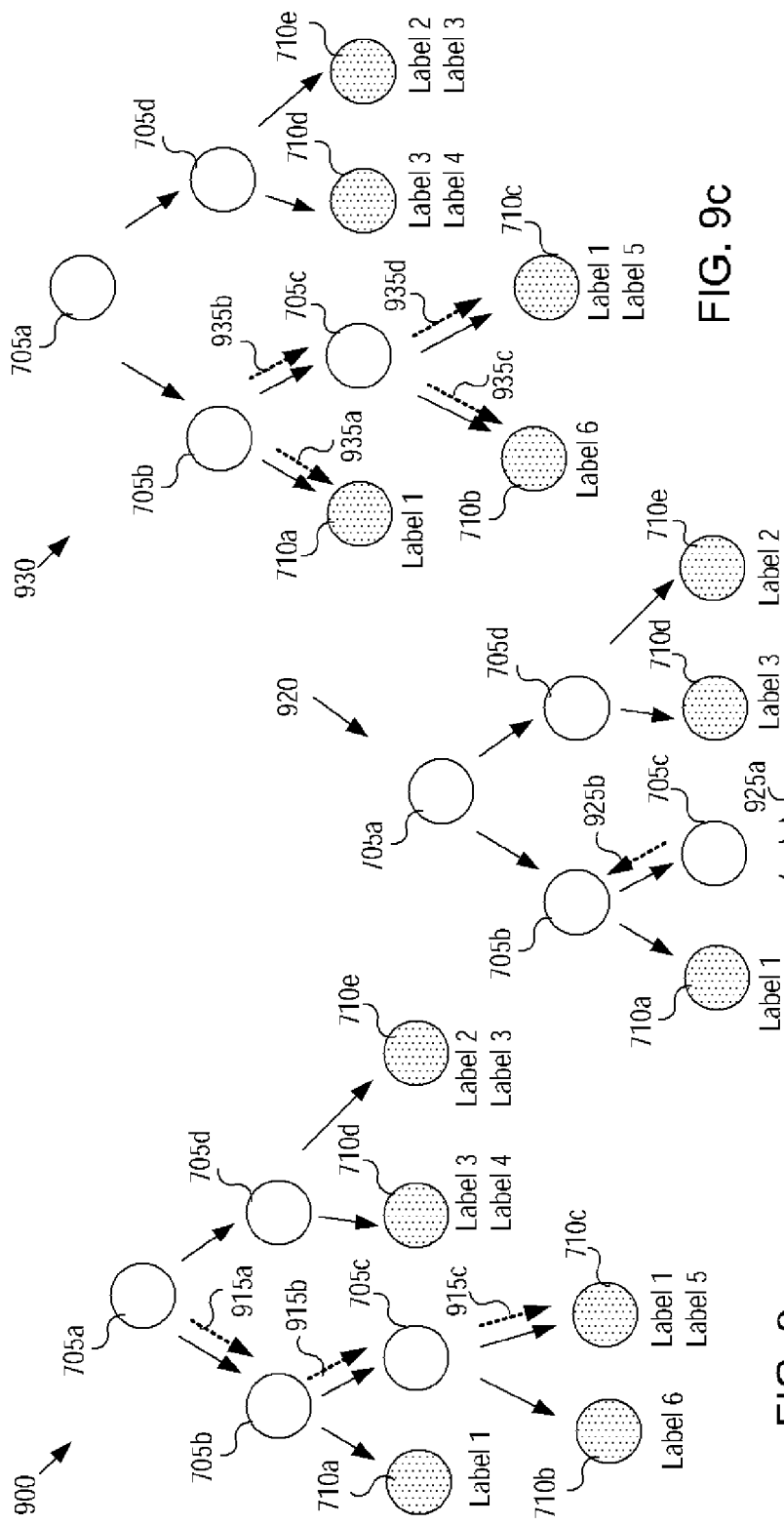
FIG. 9a shows an exemplary sequence of decisions in the tree voting structure of FIG. 7 according to embodiments of the present invention.
FIG. 9b shows an exemplary regression process in the tree voting structure of FIG. 7 according to embodiments of the present invention.
FIG. 9c shows how to select multiple leaf nodes for smooth encoding according to embodiments of the present invention.

Referring back to FIG. 1, the process of flowchart 100 proceeds to step 120. At step 120, sparse encoding (or, equivalently, smooth encoding) is performed to determine probabilities for object labels for a set of superpixels. Here, the term "a set of superpixels" refers to a subset of superpixels in an image to be recognized (i.e., the number of superpixels in the subset is equal to or fewer than the total number of superpixels in the image). More detailed description of an embodiment of step 120 is given in conjunction with FIG. 8. In FIG. 8, there is shown an exemplary flowchart 800 of an illustrative process for performing the sparse encoding according to embodiments of the present invention As depicted, at step 805, one of the local descriptors correlated to a query superpixel is selected. Then, the selected local descriptor is input to tree voting structure 700 at step 810. FIG. 9a shows an exemplary sequence of decisions 900 in tree voting structure 700 according to embodiments of the present invention. As depicted, the tree voting process assigns leaf node 710c to the selected local descriptor, i.e., tree voting structure 700 identifies leaf node 710c for the selected local descriptor.

The method repeats steps 805 and 810 until all of the correlated local descriptors are input to tree voting structure 700. If there are N number of local descriptors correlated to a query superpixel i, the probability Pr(l|i) that the query superpixel i belongs to object label l is calculated by:

$$Pr(l|i) = \frac{1}{N}\sum_{n=1}^{N} leaf_n(l) \quad (1)$$

where $leaf_n(l)$ denotes whether the n-th leaf node includes object label l, i.e., $$leaf_n(l) = \begin{cases} 1, & \text{if } leaf_n(l) \text{ includes object label } l, \\ 0 & \text{otherwise.} \end{cases} \quad (2)$$

Probability Pr(l|i) in equation (1) may also be expressed by a product of two vectors:

$$Pr(l|i) = x_i w_l \quad (3)$$

where, $x_i$ is a feature vector for superpixel i and $w_l$ is a weight vector (or, shortly, weight). The dimensions of $x_i$ and $w_l$ are the same as the number of leaf nodes of the tree voting structure. Thus, in the present example, the dimensions of these two vectors are five since tree voting structure 700 has only five leaf nodes 710a-710e, and $x_i$ can be represented by:

$$x_i = [b1, b2, b3, b4, b5]. \quad (4)$$

For N number of local descriptors, each element of feature vector $x_i$ is calculated by:

$$b_n = (\# \text{ of local descriptors that go to } leaf_n)/N. \quad (5)$$

Similarly, $w_l$ can be represented by:

$$w_l = [w_{l1}, w_{l2}, w_{l3}, w_{l4}, w_{l5}]^T, \quad (6)$$

where the n-th element of $w_l$ is calculated by:

$$w_{ln} = \begin{cases} 1, & \text{if } leaf_n \text{ includes object label } l, \\ 0 & \text{otherwise.} \end{cases} \quad (7)$$

It is noted that in embodiments of the method, which calculates feature vector $x_i$ using equations (5), votes to only one of the leaf nodes for each local descriptor. Unlike a conventional bag-of-words method, in embodiments, the tree-plus-regression methodology gives votes to multiple leaf nodes for each local descriptor to thereby perform smooth encoding (or, equivalently, sparse coding), i.e., feature vector $x_i$ is not calculated by equation (5).

In embodiments, the smooth encoding starts at step 815. At step 815, responsive to a local descriptor being assigned to a leaf node, the process involves moving up the tree voting structure a number of levels. FIG. 9b shows an exemplary smooth encoding process 930 in tree voting structure 700 according to embodiments of the present invention. As depicted, the smooth encoding process moves from leaf node 710c at Level 3 to branch node 705b at Level 1, wherein branch mode 705b is referred to as smoothing branch node. Then, at step 820, all of the leaf nodes dependent from the smoothing branch node are selected for smooth encoding. These leaf nodes that depend from the branch node represent at set of similar leaf nodes since they stem from the same branch. Thus, in the present example, leaf nodes 710a, 710b, and 710c are selected for smooth encoding, as depicted in FIG. 9c. FIG. 9c shows a diagram 930 illustrating how to select multiple leaf nodes 710a, 710b, and 710c for smooth encoding according to embodiments of the present invention.

Then, at step 825, for each local descriptor, a set of values (or, equivalently, a vector $C_j$) that represents votes to the leaf nodes dependent from the smoothing branch node is determined. Hereinafter, vector $C_j$ may be referred to as sparse code vector (or, shortly, sparse code). To determine the votes (or, equivalently, sparse code $C_j$) for a local descriptor j, a sparse coding equation is solved:

$$C_j^* \leftarrow \arg\min_C \|d_j - C_j B_j\|^2 \quad (8)$$

subject to a condition $$\sum_{m=1}^{k} C_{jm} = 1. \quad (9)$$

In equation (8), $B_j$ is a k×D matrix, referred to as a matrix of k centroids, k is the number of leaf nodes dependent from the smoothing branch node (in this example, k is 3), and D is the number of total leaf nodes in tree voting structure 700 (in this example, D is 5). Each row of centroid matrix is the centroid vector of one of the leaf nodes dependent from smoothing branch node. Thus, in the present example, the three rows of centroid matrix $B_j$ are centroids of leaf nodes 710a, 710b, and 710c. $d_j$ is a vector, referred to as descriptor vector, that represents local descriptor j and its dimension is D, i.e., the dimension of $d_j$ is the same as that of the leaf centroids. In embodiments, the elements of $d_j$ may include various information of a patch associated with local descriptor j, such as location of the center of the patch and representative color of the patch, even though other suitable information may be included in the descriptor vector. $C_{jm}$ in equation (9) represents the m-th element of vector $C_j$.

In equations (8) and (9), the sparse code, $C_j$, has a dimension of K, i.e., the dimension of $C_j$ is the same as the number of leaf nodes dependent from the smoothing branch node. Equation (9) is a constraint condition that requires the sum of all components of $C_j$ be equal to 1. Equation (8) is solved to determine $C_j$ under the condition that the distance between descriptor vector $d_j$ and centroid matrix $B_j$ weighted by the vector $C_j$ is minimum while the constraint of equation (9) is satisfied. $C_j^*$ in equation (8) represents a vector $C_j$ that satisfies both equations (8) and (9).

As discussed above, sparse code $C_j^*$ represents the votes to leaf nodes, such as 910a, 910b, and 910c, dependent from the smoothing branch node, such as 905b, for local descriptor j. Having determined sparse code $C_j^*$ for local descriptor j, the process of flowchart 800 proceeds to step 830. At step 830, a decision is made whether there is any local descriptor that has not been input to tree voting structure 700. If the answer to the decision is affirmative, the process proceeds to step 805 and repeats steps 810-830. Otherwise, the process proceeds to step 835.

Having determined sparse codes for a set of local descriptors correlated to superpixel i, feature vector $x_i$ for superpixel i can be calculated by combining the sparse codes over the set of local descriptors at step 835. In the present example, there are only five leaf nodes. Thus, feature vector $x_i$ for superpixel i can be represented by:

$$x_i = [b1, b2, b3, b4, b5], \quad (10)$$

where, for N number of local descriptors correlated to superpixel i, each element of feature vector $x_i$ is calculated by:

$$b_n = \sum_{j=1}^{N} (\text{vote to } leaf_n \text{ for } C_j^*). \quad (11)$$

In equation (11), element $b_n$ of feature vector $x_i$ for superpixel i is calculated by summing votes to the n-th leaf node over all of the sparse codes for local descriptors correlated to superpixel i. For instance, the first element $b_1$ is the summation of votes to the first leaf node 710a over all of the sparse codes for local descriptors correlated to superpixel i.

As discussed above, in a conventional bag-of-words approach, each local descriptor votes to only one leaf node. In contrast, sparse code $C_j^*$ represents the votes to multiple leaf nodes for each local descriptor. Thus, in embodiments, the smooth encoding has the effect of distributing votes to the multiple leaf nodes instead of one leaf node for each local descriptor, resulting in the effect of smoothing the prediction of object labels for each local descriptor. In general, the number of multiple leaf nodes dependent from a smoothing branch node increases as the smoothing branch node approaches the root node, and as a consequence, the effect of smooth encoding increases. However, as the number of dependent multiple nodes increases, the total computation time also increases. As such, in embodiments, the number of levels to move up at step 815 may be heuristically determined. In embodiments, the heuristical determination may be based upon entropy, where higher entropy indicates more distinguishing. In embodiments, the number of levels is used as a parameter to control the sparsity of the sparse code, which differs from existing sparse coding algorithm using $L_1$ regularization where the sparsity is controlled by a predetermined weight of the $L_1$ term.

Having determined feature vectors $x_i$, probability Pr(l|i) that superpixel i belongs to object label l may be calculated at step 840 using a classification technique. For example, in embodiments, the feature vectors $x_i$ may be input into a regression model to obtain object label probabilities. In embodiments, a multi-nominal logistic regression (or, Max-Entropy) technique is used, wherein probability Pr(l|i) is calculated by:

$$Pr(l \mid i) = \frac{\exp(x_i w_l)}{\sum_{t=1}^{M} \exp(x_i w_t)} \quad (12)$$

where M is the number of cable types and $w_l$ is represented by:

$$w_l = [w_{l1}, w_{l2}, w_{l3}, w_{l4}, w_{l5}]^T. \quad (13)$$

Figure 10:
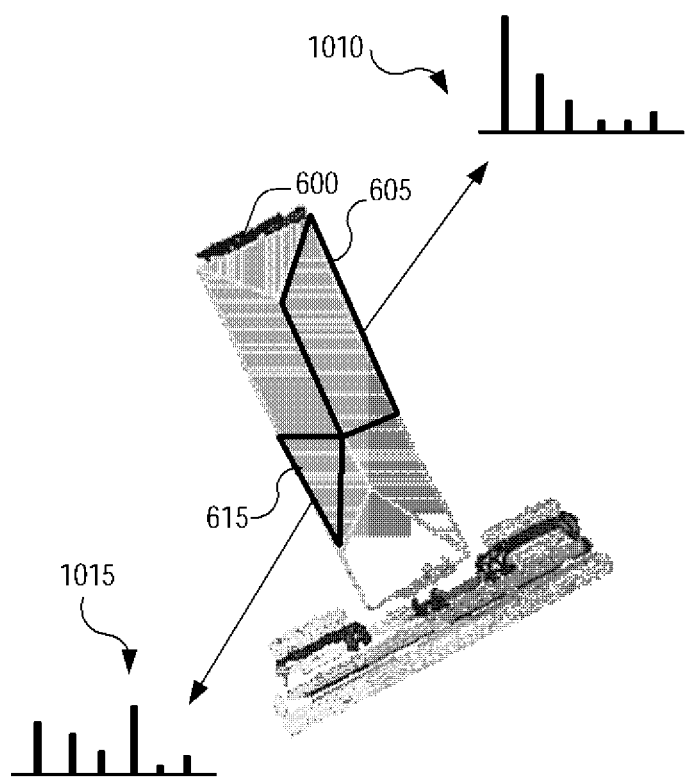
FIG. 10 shows histograms indicating probabilities for object labels for the superpixels in FIG. 6 according to embodiments of the present invention.

FIG. 10 shows histograms indicating probabilities for object labels for the superpixels in FIG. 6 according to embodiments of the present invention. As depicted, histogram 1010 indicates that superpixel 605 has the highest probability of being the first object label. In another example, histogram 1015 indicates that superpixel 615 has the highest probability of being the fourth object label. In embodiments, as explained in more detail below, an object label for the query superpixel may be assigned 845 based on the dominant probability for the query superpixel or may assigned 845 by considering other factors.

Referring back to FIG. 1, the process of flowchart 100 proceeds to step 125. At step 125, each superpixel may be assigned/predicted to an object label based on, at least in part, the probabilities determined by equation (12). In some embodiments, the histograms in FIG. 10 may be used to predict to an object label for each superpixel. In other embodiments, to enhance the accuracy in prediction, the degree of proximity between superpixels may be also considered as another factor. More specifically, in embodiments, a graph-based global decision may be applied to determine a smoothness factor, where the smoothness factor indicates the probability that two superpixels are neighbors. As explained below, in embodiments, the term neighbor may refer to the degree of proximity between two superpixels in terms of spatial, colors, angular distances, or a combination thereof.

The graph-based global decision uses an objective function based on the energy of the graph, and expressed as:

$$F(I) = \sum_i \left( \sum_l \left( \phi(i, l) + \lambda \sum_{j,m} \psi(i, l, j, m) \right) \right) = \sum_i \left( \sum_l \left( \phi(i, l) + \lambda \sum_{j,m} w_{i,j} \xi(l, m) \right) \right) \quad (14)$$

where i and j denotes superpixels, and/and m denotes the object labels. $\phi(i,l)$ is the term that measures the energy when superpixel i takes object label l, and may be calculated by:

$$\phi(i,l) = 1 - Pr(l|i) \quad (15)$$

where $Pr(l|i)$ is the probability if superpixel i takes object label l, and may be obtained by solving equation (12). In embodiments, $w_{i,j}\xi(l,m)$ is the smoothness factor that measures the energy when superpixels i and j take object labels l and m, respectively. In embodiments, $\xi(l,m)$ denotes the energy when labels m to l are neighbors and is calculated by:

$$\xi(l,m) = 1 - \delta(l-m) \quad (16)$$

where $\delta(l-m)$ is the Dirac delta function. In embodiments, $w_{i,j}$ denotes the probability that two superpixels i and j are neighbors and may be expressed by an equation:

$$w_{i,j} = P(j|i), \quad (17)$$

where, in embodiments, probability $P(j|i)$ may be affected by spatial distance, angular distance, color distance, multi-scale/multi-view distance, or some combination thereof. In embodiments, the spatial distance may be calculated by $$D_s(i/j) = \exp(-\|i_{center} - j_{center}\|^2 / \sigma_s). \quad (18)$$

In embodiments, the angular distance may be calculated by $$D_a(i,j) = \exp(-\|i_{angle} - j_{angle}\|^2 / \sigma_a). \quad (19)$$

In embodiments, the color distance may be calculated by $$D_c(i,j) = \exp(-\|i_{rgb} - j_{rgb}\|^2 / \sigma_c). \quad (20)$$

where $\sigma_s$, $\sigma_a$, and $\sigma_c$ in equations (18), (19) and (20) are empirical constants. Then, in embodiments, probability $P(j|i)$ may be calculated by:

$$P(j|i) = D_s(i,j) D_a(i,j) D_c(i,j). \quad (21)$$

Figure 11:
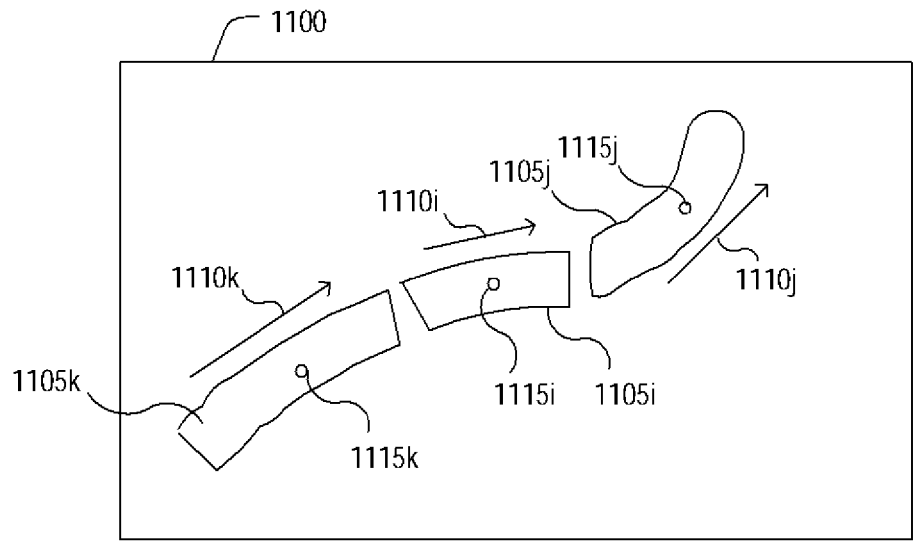
FIG. 11 shows a portion of a cable image having superpixels according to embodiments of the present invention.

Consider, by way of illustration, the example given in FIG. 11. FIG. 11 shows a portion 1100 of a cable image having superpixels 1105i, 1105j, and 1105k according to embodiments of the present invention. As depicted, superpixels 1105i, 1105j, and 1105k may be associated with center points 1115i, 1115j, and 1115k. In embodiments, the center points may be the center of gravity of the corresponding superpixel, although other points may be selected. The term $\|i_{center} - j_{center}\|$ in the equation (18) represents the spatial distance between center points 1115i and 1115j. Arrows 1110i, 1110j, and 1110k in FIG. 11 represent the orientations of superpixels 1105i, 1105j, and 1105k. The term $\|i_{angle} - j_{angle}\|$ in equation (19) represents the angle between arrows 1110i and 1110j. Finally, each superpixel may be represented by a combination of colors (e.g., red-blue-green) that may be calculated by averaging the colors of image pixels in the superpixel, for instance. In embodiments, the term $i_{rbg}$ in the equation (20) may be a vector that includes three numbers for the three colors, and the term $\|i_{rgb} - j_{rgb}\|$ in the equation (20) represents the color distance between superpixels 1105i and 1105j.

In embodiments, probability $P(j|i)$ in the equation (21) may include an additional correction factor, $D_l(i,j)$, based on the layer distance, where $D_l(i,j)$ is defined as:

$$D_l(i,j) = \#pixel(i \cap j) / \min(\#pixel(i), \#pixel(j)). \quad (22)$$

Figure 12:
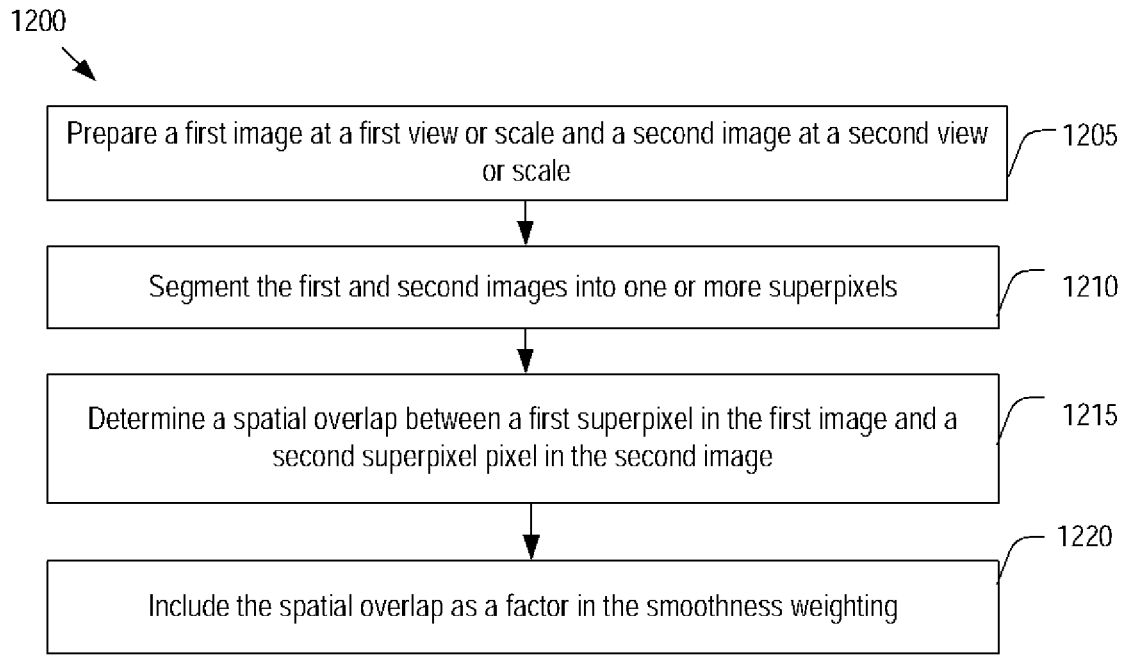
FIG. 12 shows a flowchart of an illustrative process for determining a layer distance between superpixels in two separate images according to embodiments of the present invention.

Equation (22) may be calculated following the steps in the flowchart of FIG. 12.

Figure 13:
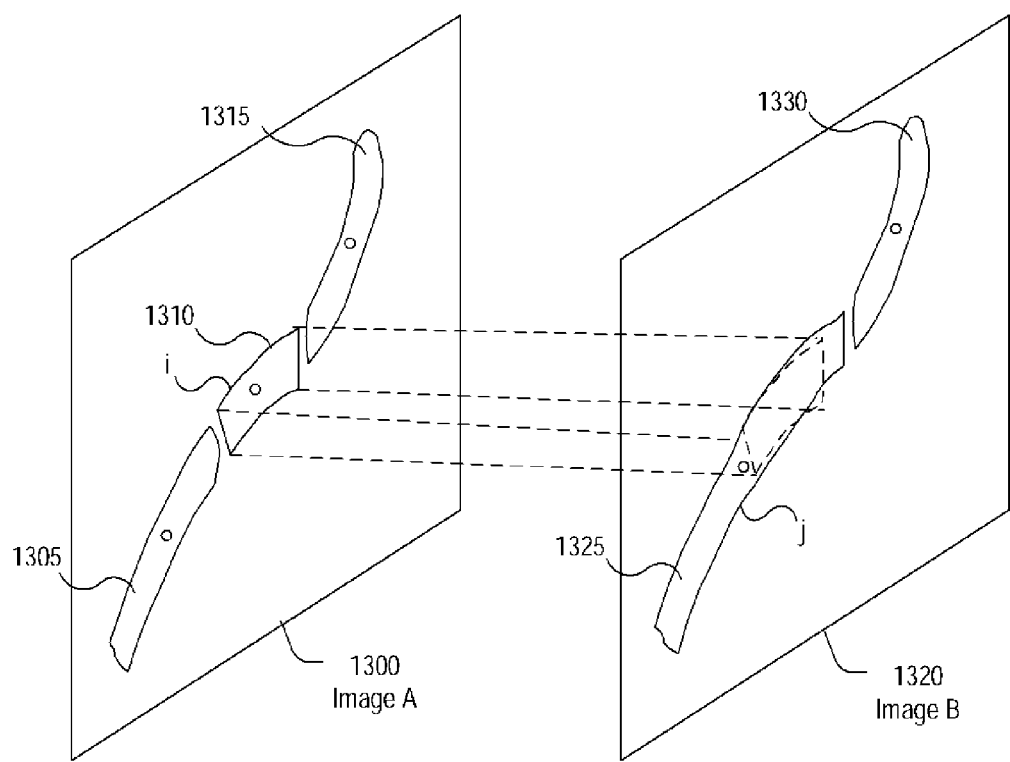
FIG. 13 shows superpixels in two separate images that might be used to carry out the steps in the flowchart of FIG. 12, according to embodiments of the present invention.

FIG. 12 shows a flowchart 1200 of an illustrative process for determining a layer distance between superpixels in two separate images according to embodiments of the present invention. The process starts at step 1205. At step 1205, two separate images are prepared, where the two separate images may be, for instance, multi-scale images 300 and 310 in FIGS. 3A-3B, or multi-view images. At step 1210, the two images are segmented into multiple superpixels, wherein each of the two images may be segmented by performing step 105. FIG. 13 shows two images 1300 and 1320, where the two images include superpixels 1305, 1310, and 1315, and 1325 and 1330, respectively.

Next, in step 1215, the spatial overlap between two superpixels, say superpixel 1310 and superpixel 1325, is calculated. FIG. 13 illustrates how the overlap can be determined. By comparing the spatial locations of superpixels 1310 and 1325, superpixel 1310 may be projected onto image 1320, and the overlapped region can be determined. Then, the number of image pixels in the overlapped region is counted, where the term #pixel (i∩j) in the equation (22) represents this number. The term #pixel(i) represents the number of image pixels in superpixel i. Then, the process proceeds to step 1220. At step 1220, the term $D_l(i,j)$ calculated by equation (22) is multiplied to the term $P(j|i)$ in equation (21) so that the layer distance can be included in determining the smoothness factor.

It is noted that the layer distance correction term, $D_l(i,j)$, is calculated using two separate images, where the images are multi-scale images of an object. However, other pair of images may be used to calculate the layer distance correction term. For example, two images can be taken from the same object at two different views. In another example, two images may be taken from the same object at two different views and scales. In yet another example, two different layer distance correction terms can be calculated: one for multi-scale images of an electrical cable, and another for two images at different views. Then, the two distance layer correction terms may be included as terms in equation (21).

Once the smoothness factor is calculated, the condition to minimize the energy function is determined by estimating the optimal set of labels for each node (superpixel) that minimize the overall energy of the graph.

As discussed above, in embodiments, following flowchart 800 in FIG. 8, the probabilities for object labels for each superpixel may be calculated. Also, in embodiments, following flowchart 1200 in FIG. 12, the smoothness factor may be determined for each superpixel. Then, considering the probabilities and smoothness factor, the energy function in equation (14) is solved to predict an object label for each superpixel of an image. In embodiments, superpixels of the same label and proximity may be concatenated. Then, using the predicted object labels for the concatenated superpixels, an object label for each object contained in the image may be predicted. In embodiments, image 600 of an object in FIG. 10 may be formed by concatenating superpixels 605 and 615 as well as other neighboring superpixels that are not shown in FIG. 10 for brevity. In embodiments, the superpixels may be concatenated by methods including, but not limited to, connected component analysis. Also, using the location information of the concatenated superpixels, the location of image 600 can be determined, too.

Figure 14:
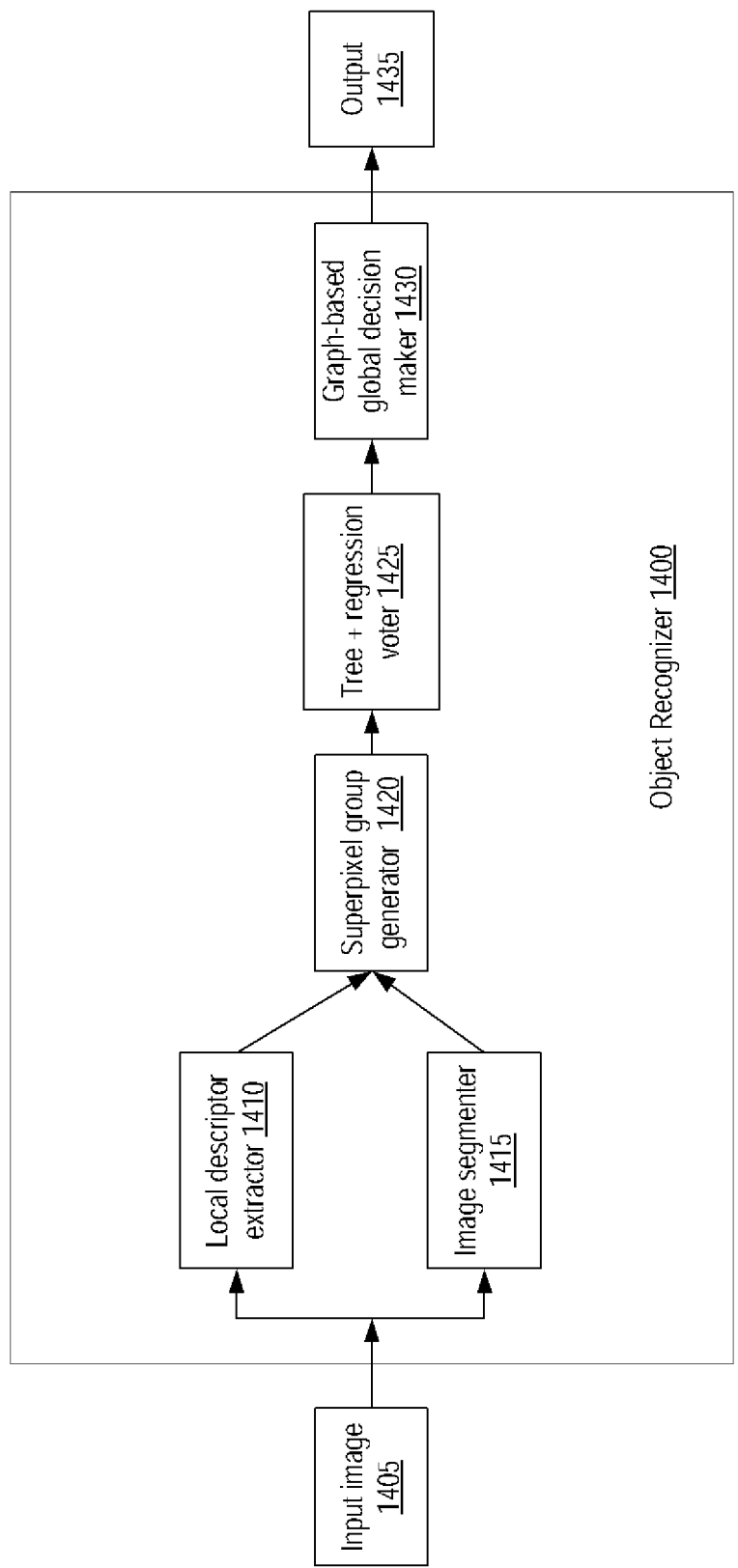
FIG. 14 shows a schematic block diagram of a system that might be used to carry out the steps in the flowchart of FIG. 1, according to embodiments of the present invention.

FIG. 14 shows an exemplary schematic block diagram of system 1400 that might be used to carry out the steps in flowchart 100 of FIG. 1. As depicted, system 1400, referred to as an object recognizer, receives input image 1405 through an interface not shown in FIG. 14 for brevity. Then, input image 1405 may be processed by local descriptor extractor 1410 and image segmenter 1415, where local descriptor extractor 1410 extracts local descriptors from input image 1405 while image segmenter 1415 segments input image 1405 into superpixels, as in steps 110 and 105. It is noted that local descriptor extractor 1410 and image segmenter 1415 may process input image 1405 simultaneously or in sequence.

The image processed by local descriptor extractor 1410 and image segmenter 1415 may be input to superpixel group generator 1420. Superpixel group generator 1420 may correlate the local descriptors to the superpixels based on the locations of the local descriptors and superpixels, as in step 115. In embodiments, the output from superpixel group generator 1420 may be input to tree-plus-regression voter 1425. Tree-plus-regression voter 1425 may perform the tree-plus-regression vote to determine the probabilities for object labels for each superpixel in accordance with flowchart 800 of FIG. 8.

In embodiments, using the output from tree-plus-regression voter 1425, graph-based global decision maker 1430 may calculate the smoothness factor to enhance the accuracy in predicting an object label for each superpixel in accordance with flowchart 1400 of FIG. 14. Then, object recognizer 1400 may send output 1435, where output 1435 may include an assignment of an object label to each superpixel. In embodiments, the superpixels may be concatenated and output 1435 may include the recognition and location information of the image comprising the concatenated superpixels.

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present invention may be implemented in any instruction-execution/computing device or system capable of processing data, including, without limitation phones, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 15:
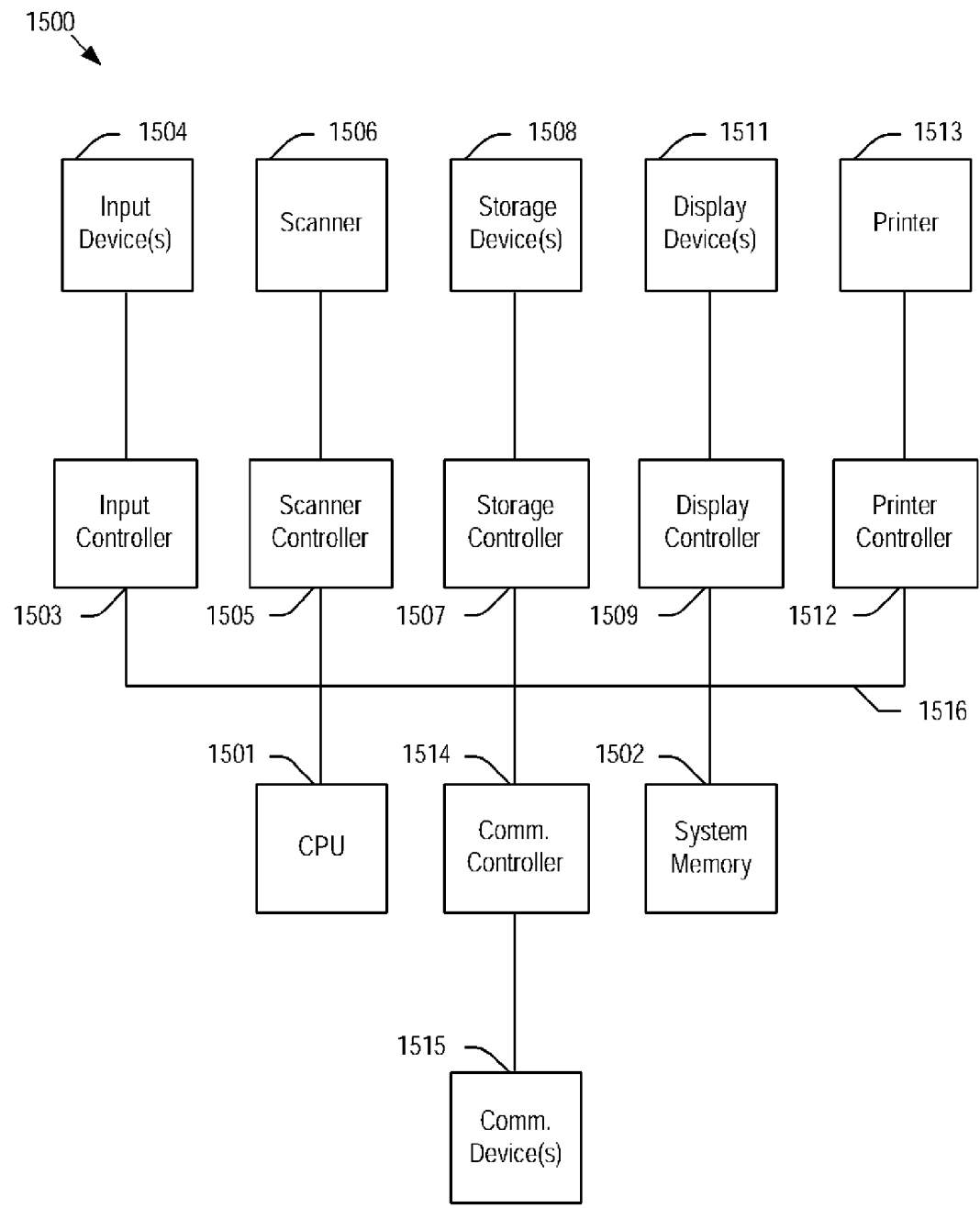
FIG. 15 shows a computer system according to embodiments of the present invention.

Having described the details of the invention, an exemplary system 1500, which may be used to implement one or more aspects of the present invention, will now be described with reference to FIG. 15. As illustrated in FIG. 15, system 1500 includes a central processing unit (CPU) 1501 that provides computing resources and controls the computer. CPU 1501 may be implemented with a microprocessor or the like, and may also include a graphics processor and/or a floating point coprocessor for mathematical computations. System 1500 may also include a system memory 1502, which may be in the form of random-access memory (RAM) and read-only memory (ROM).

A number of controllers and peripheral devices may also be provided, as shown in FIG. 15. An input controller 1503 represents an interface to various input device(s) 1504, such as a keyboard, mouse, or stylus. There may also be a scanner controller 1505, which communicates with a scanner 1506. System 1500 may also include a storage controller 1507 for interfacing with one or more storage devices 1508 each of which includes a storage medium such as magnetic tape or disk, or an optical medium that might be used to record programs of instructions for operating systems, utilities and applications which may include embodiments of programs that implement various aspects of the present invention. Storage device(s) 1508 may also be used to store processed data or data to be processed in accordance with the invention. System 1500 may also include a display controller 1509 for providing an interface to a display device 1511, which may be a cathode ray tube (CRT), a thin film transistor (TFT) display, or other type of display. System 1500 may also include a printer controller 1512 for communicating with a printer 1513. A communications controller 1514 may interface with one or more communication devices 1515, which enables system 1500 to connect to remote devices through any of a variety of networks including the Internet, a local area network (LAN), a wide area network (WAN), or through any suitable electromagnetic carrier signals including infrared signals.

In the illustrated system, all major system components may connect to a bus 1516, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for identifying an object in an image, comprising:
   segmenting a first image of an object into one or more superpixels, each superpixel having a known location;
   extracting local descriptors from the first image, each of the local descriptors having an interest point with a location;
   correlating the local descriptors to the superpixels based on locations of the local descriptors and superpixels;
   for each superpixel from a set of the superpixels from the one or more superpixels:
      for each local descriptor of a set of local descriptors correlated to the superpixel, obtaining a sparse code based on distance between the local descriptor and a set of similar leaf nodes in a tree voting structure; and
      combining the sparse code obtained from the local descriptors correlated to the superpixel to form a feature representing the superpixel; and
   assigning an object label to each superpixel from the set of the superpixels based, at least in part, on the feature that represents the superpixel.

2. A computer-implemented method as recited in claim 1, wherein the step of obtaining a sparse code comprises:

inputting a local descriptor into the tree voting structure to assign it to a leaf node of the tree voting structure;
responsive to assigning the local descriptor to a leaf node, moving up the tree voting structure a predetermined number of levels from the assigned leaf node to a branch node;
identifying the set of similar leaf nodes as leaf nodes dependent from the branch node; and
determining the sparse code for the local descriptor under a condition that a distance between the local descriptor and centroids of the leaf nodes from the set of similar leaf nodes weighted by the sparse code is minimized, the sparse code representing a smoothed voting of the set of similar leaf nodes dependent from the branch node.

3. A computer-implemented method as recited in claim 2, wherein the step of combining the sparse code obtained from the local descriptors correlated to the superpixel to form a feature representing the superpixel comprises:
   forming the feature comprising a value for each leaf node in the tree voting structure, wherein the value for a leaf node comprising a sum of values for that leaf node from the sparse codes obtained from the local descriptors correlated to the superpixel, the sum being divided by the number of local descriptors correlated to the superpixel.

4. A computer-implemented method as recited in claim 3, wherein the step of assigning an object label to each superpixel from the set of the superpixels based, at least in part, on the feature that represents the superpixel, comprises, each superpixel from the set of the superpixels:
   obtaining probabilities of object labels for a superpixel by inputting the feature that represents the superpixel into a trained classification model; and
   using the obtained probabilities, at least in part, to assign an object label to the superpixel.

5. A computer-implemented method as recited in claim 4, wherein the trained classification model is a regression model.

6. A computer-implemented method as recited in claim 4, wherein the step of using the obtained probabilities, at least in part, to assign an object label to the superpixel, further comprises:
   assigning the object label to the superpixel based on the probabilities and a smoothness factor, the smoothness factor being weighted by an angular distance between at least two superpixels.

7. A computer-implemented method as recited in claim 4, wherein the step of using the obtained probabilities, at least in part, to assign an object label to the superpixel, further comprises:
   segmenting a second image of the object into one or more superpixels;
   determining a spatial overlap between a first superpixel in the first image and a second superpixel pixel in the second image;
   determining a smoothness factor weighted by the spatial overlap; and
   assigning the object label to the superpixel based on the probabilities and the smoothness factor.

8. A computer-implemented method as recited in claim 7, wherein the smoothness factor is further weighted by an angular distance between superpixels.

9. A non-transitory computer-readable medium or media comprising one or more sequences of instructions which, when executed by one or more processors, causes the one or more processors to perform at least the steps of claim 1.

10. A computer-implemented method for smooth encoding comprising:
for a descriptor:
inputting the descriptor into a tree voting structure to identify to a leaf node of the tree voting structure for the descriptor;
responsive to identifying the leaf node, moving up the tree voting structure a number of levels from the identified leaf node to a branch node to identify leaf nodes dependent from the branch node;
determining a sparse code under a condition that a distance between the descriptor and centroids of the leaf nodes dependent from the branch node weighted by the sparse code is minimized, wherein each element of the sparse code representing a weight corresponding to leaf nodes.

11. A computer-implemented method as recited in claim 10, wherein the sparse code is used in classification, and the method further comprises:
forming a feature comprising the sparse code;
obtaining probabilities of labels for the feature by inputting the feature into a trained classification model; and
using the obtained probabilities, at least in part, to assign a label to the feature.

12. A computer-implemented method as recited in claim 11, wherein the trained classification model is a regression model.

13. A computer-implemented method as recited in claim 10, wherein:
the feature is formed from a set of sparse codes corresponding to a set of related descriptors.

14. A computer-implemented method as recited in claim 13, wherein a set of related descriptors are obtained from an image by performing the steps comprising:
segmenting a first image into one or more superpixels, each superpixel having a known location;
extracting descriptors from the first image, each of the descriptors having an interest point with a location;
forming a set of related descriptors by correlating descriptors to a superpixel based on locations of the descriptors and the superpixel.

15. A computer-implemented method as recited in claim 14 further comprising:
forming a feature for each superpixel from a set of superpixels from the image; and
obtaining probabilities of labels for the features by inputting each of the features into a trained classification model; and
assigning an object label to each superpixel corresponding to a feature based on the probabilities of the feature and a smoothness factor, the smoothness factor being weighted by an angular distance between the superpixel and at least one other superpixel.

16. A computer-implemented method as recited in claim 15, wherein the smoothness factor is further weighted by at least one of: color distance between the superpixel and at least one other superpixel; spatial distance between the superpixel and at least one other superpixel; and region overlap between the superpixel and at least one other superpixel.

17. A non-transitory computer-readable medium or media comprising one or more sequences of instructions which, when executed by one or more processors, causes the one or more processors to perform at least the steps of claim 10.

18. A system for identifying an object in an image, comprising:
a local descriptor extractor for extracting local descriptors from the image, each of the local descriptors having an interest point with a location;
an image segmenter coupled to the local descriptor extractor and operative to segment the image into one or more superpixels, each superpixel having a known location;
a superpixel group generator coupled to the local descriptor extractor and image segmenter and operative to correlate the local descriptors to the superpixels based on locations of the local descriptors and superpixels;
a tree-plus-classification-model voter coupled to the superpixel group generator and operative to perform for each superpixel from a set of the superpixels the steps comprising:
for each local descriptor of a set of local descriptors correlated to the superpixel, obtaining a sparse code based on distance between the local descriptor and a set of similar leaf nodes in a tree voting structure;
combining the sparse code obtained from the local descriptors correlated to the superpixel to form a feature representing the superpixel; and
obtaining probabilities of object labels for a superpixel by inputting the feature that represents the superpixel into a trained classification model; and
a graph-based global decision maker coupled to the tree-plus-classification-model voter and operative to assign an object label to each superpixel from the set of the superpixels based, at least in part, on the probabilities.

19. A system as recited in claim 18, wherein the step of obtaining a sparse code comprises:
inputting a local descriptor into the tree voting structure to assign it to a leaf node of the tree voting structure;
responsive to assigning the local descriptor to a leaf node, moving up the tree voting structure a predetermined number of levels from the assigned leaf node to a branch node;
identifying the set of related leaf nodes as leaf nodes dependent from the branch node; and
determining the sparse code for the local descriptor under a condition that a distance between the local descriptor and centroids of the leaf nodes from the set of similar leaf nodes weighted by the sparse code is minimized, the sparse code representing a smoothed voting of the set of similar leaf nodes dependent from the branch node.

20. A computer-implemented method as recited in claim 19, wherein the step of combining the sparse code obtained from the local descriptors correlated to the superpixel to form a feature representing the superpixel comprises:
forming the feature comprising a value for each leaf node in the tree voting structure, wherein the value for a leaf node comprising a sum of values for that leaf node from the sparse codes obtained from the local descriptors correlated to the superpixel, the sum being divided by the number of local descriptors correlated to the superpixel.

* * * * *